(12) United States Patent
Dorfling et al.

(10) Patent No.: US 11,967,908 B2
(45) Date of Patent: Apr. 23, 2024

(54) MODEL PREDICTIVE PULSE PATTERN CONTROL BASED ON SMALL-SIGNAL PULSE PATTERN OPTIMIZATION

(71) Applicant: ABB Schweiz AG, Baden (CH)

(72) Inventors: Martinus David Dorfling, Durbanville (ZA); Hendrik Du Toit Mouton, Stellenbosch (ZA); Tobias Geyer, Ennetbaden (CH)

(73) Assignee: ABB Schweiz AG, Baden (CH)

( * ) Notice: Subject to any disclaimer, the term of this patent is extended or adjusted under 35 U.S.C. 154(b) by 219 days.

(21) Appl. No.: 17/764,793

(22) PCT Filed: Sep. 29, 2020

(86) PCT No.: PCT/EP2020/077246
§ 371 (c)(1),
(2) Date: Mar. 29, 2022

(87) PCT Pub. No.: WO2021/069259
PCT Pub. Date: Apr. 15, 2021

(65) Prior Publication Data
US 2022/0368247 A1   Nov. 17, 2022

(30) Foreign Application Priority Data
Oct. 11, 2019   (EP) .................................... 19202732

(51) Int. Cl.
*H02M 7/5387* (2007.01)
*H02P 27/12* (2006.01)
*H02P 27/14* (2006.01)

(52) U.S. Cl.
CPC ........ *H02M 7/53876* (2021.05); *H02P 27/12* (2013.01); *H02P 27/14* (2013.01)

(58) Field of Classification Search
CPC ........... H02M 7/53871; H02M 7/5387; H02M 7/53876; H02P 27/12; H02P 27/14
See application file for complete search history.

(56) References Cited

U.S. PATENT DOCUMENTS

| | | | |
|---|---|---|---|
| 2015/0171726 A1* | 6/2015 | Singh Riar | H02M 7/797 363/65 |
| 2020/0350847 A1* | 11/2020 | Geyer | H02P 21/30 |
| 2023/0042964 A1* | 2/2023 | Tsoumas | H02M 1/15 |

FOREIGN PATENT DOCUMENTS

| | | |
|---|---|---|
| EP | 2469692 A1 | 6/2012 |
| EP | 3262741 A1 | 1/2018 |

(Continued)

OTHER PUBLICATIONS

Mouton et al., "Trajectory-based LQR control of a grid-connected converter with an LCL filter", in Proc. IFAC Conf. on Nonlin. Model Predictive Control, (Madison, WI, USA), Aug. 2018.

(Continued)

*Primary Examiner* — Adolf D Berhane
(74) *Attorney, Agent, or Firm* — Armstrong Teasdale LLP (57) ABSTRACT

Disclosed herein is a method for controlling an electrical converter system that includes: determining a nominal pulse pattern ($t_{p,i}^*$, $\Delta u_{p,i}^*$) and a reference trajectory ($x^*$) of at least one electrical quantity of the electrical converter system over a horizon of future sampling instants, the nominal pulse pattern ($t_{p,i}^*$, $\Delta u_{p,i}^*$) comprises switching transitions ($\Delta u_{p,i}^*$) between output voltages of an electrical converter of the electrical converter system and the reference trajectory ($x^*$) indicates a desired future development of an electrical quantity of the converter system; determining a small-signal pulse pattern ($\tilde{u}_{abc}(t, \lambda_{p,i})$) by minimizing a cost function; determining a modified pulse pattern ($t_{opt,p,i}$, $\Delta u_{p,i}$) by moving the switching transitions of the nominal pulse pattern ($t_{p,i}^*$, $\Delta u_{p,i}^*$) to generate modified switching transitions;

(Continued)

and applying at least the next switching transition of the modified pulse pattern ($t_{opt,p,i}$, $\Delta u_{p,i}$) to the electrical converter system.

15 Claims, 3 Drawing Sheets (56) References Cited

FOREIGN PATENT DOCUMENTS

| EP | 3058646 | B1 | 4/2018 |
|---|---|---|---|
| EP | 3501091 | A1 | 6/2019 |
| EP | 3529888 | A1 | 8/2019 |
| WO | 2016134874 | A1 | 9/2016 |

OTHER PUBLICATIONS

Mariéthoz et al., "Explicit model predictive control of a PWM inverter with an LCL filter", IEEE Trans. Ind.Electron., vol. 56, pp. 389-399, Feb. 2009.
Pejcic et al., "Voltage source converter MPC with optimized pulse patterns and minimization of integrated squared tracking error", in Proc. Am. Control Conf., (Seattle, WAA, USA), May 2017.
McGrath et al., "High-performance current regulation for low-pulseratio inverters", IEEE Trans. Ind. Appl., vol. 49, pp. 149-158, Jan./Feb. 2013.
Geyer, "Model predictive control of high power converters and industrial drives", Wiley, London, UK, Oct. 2016.
Pejcic, "Spectral predictive control in power electronics", Master's thesis, EPFL, Automatic Control Laboratory, Aug. 2014.
Buja, "Optimum output waveforms in PWM inverters", IEEE Trans. Ind. Appl., 16(6):830-836, Nov./Dec. 1980.
Patel et al., "Generalized techniques of harmonic elimination and voltage control in thyristor inverters: Part I Harmonic elimination", IEEE Trans. Ind. Appl., IA-9(3):310_317, May/Jun. 1973.
Rawlings et al., "Model predictive control: Theory and design", Nob Hill Publ., Madison, WI, USA, 2009.
Geyer et al., "Model predictive pulse pattern control", IEEE Trans. Ind. Appl., 48(2):663-676, Mar./Apr. 2012.
Al Hokayem et al., "Active damping for model predictive pulse pattern control", In Proc. IEEE Energy Convers. Congr. Expo., pp. 1220-1227, Pittsburgh, PA, USA, Sep. 2014.
C. F. van Loan, "Computing integrals involving the matrix exponentials", IEEE Trans. Automat. Contr., 23(3):395-404, Jun. 1978.
Griva et al., "Linear and nonlinear optimization", SIAM, 2nd Edition, 2009.
Nesterov, "A method of solving a convex programming problem with convergence rate O(1=k2)", Soviet Math. Dokl., 27(2):372-386, 1983.
Karmarkar, "A new polynomialtime algorithm for linear programming", 4(4):373-395, Dec. 1984.
R. P. Aguilera et al., "Selective harmonic elimination model predictive control for multilevel power converters", IEEE Trans. Power Electron., vol. 32, pp. 2416-2426, Mar. 2017.
Almér, "Predictive pulse pattern control of an inverter with LCL filter: A nonlinear transformation approach", in Proc. IEEE Energy Convers. Congr. Expo., (Kaohsiung, Taiwan), 2017.
Laczynski et al., "Active damping of LC-filters for high power drives using synchronous optimal pulsewidth modulation", in Proc. IEEE Power Electron. Spec. Conf., pp. 1033-1040, Jun. 2008.
Laczynski et al., "Energy-based modulation error control for highpower drives with output LC-filters and synchronous optimal pulse width modulation", in Proc. IEEE Power Electron. and Motion Control Conf., pp. 649-656, Sep. 2008.
Quevedo et al., "Model Predictive Control for Power Electronics Applications", Handbook of Model Predictive Control, Springer International Publishing, (Nov. 30, 2018), pp. 551-580, doi:10.1007/978-3-319-77489-3_23, ISSN 2373-7719, ISBN 978-3-319-77489-3, XP055684249.
Geyer et al., "Hybrid Model Predictive Control on the Step-Down DC-DC Converter", IEEE Transactions on Control Systems Technology, IEEE Service Center, New York, NY, US, (Nov. 1, 2008), vol. 16, No. 6, doi:10.1109/TCST.2008.917221, ISSN 1063-6536, pp. 1112-1124, XP011225968.
Cairano et al., "Model predictive controller matching: Can MPC enjoy small signal properties of my favorite linear controller?", 2009 European Control Conference (ECC), IEEE, ISBN 978-3-9524173-9-3, (Aug. 23, 2009), pp. 2217-2222, (Mar. 31, 2015), XP032758051.
International Search Report and Written Opinion issued in International Patent Application No. PCT/EP2020/077246, dated Apr. 11, 2020, 12 pages.

* cited by examiner

MODEL PREDICTIVE PULSE PATTERN CONTROL BASED ON SMALL-SIGNAL PULSE PATTERN OPTIMIZATION

CROSS-REFERENCE TO RELATED APPLICATIONS

This application is a National Stage Entry of International Patent Application No. PCT/EP2020/077246, filed Sep. 29, 2020 and titled "MODEL PREDICTIVE PULSE PATTERN CONTROL BASED ON SMALL-SIGNAL PULSE PATTERN OPTIMIZATION", which claims priority to European Patent Application No. 19202732.4, filed Oct. 11, 2019 and titled "MODEL PREDICTIVE PULSE PATTERN CONTROL BASED ON SMALL-SIGNAL PULSE PATTERN OPTIMIZATION", each of which are hereby incorporated by reference in their entirety.

BACKGROUND

The present disclosure relates to the field of control of electrical converters. In particular, the present disclosure relates to a method, a computer program, a computer-readable medium and a controller for controlling an electrical converter system. Additionally, the present disclosure relates to an electrical converter system.

Optimized pulse patterns (OPP) are particularly suitable for medium-voltage converters thanks to their low total harmonic distortions (THD) at low switching frequencies. To achieve fast closed-loop control and to reject disturbances, model predictive control (MPC) methods are promising for power electronic applications. In particular, model predictive pulse pattern control ($MP^3C$) may be seen as an adaptation of the MPC principle to the control problem of OPPs. $MP^3C$ controls the stator flux vector of an electrical machine along its nominal trajectory by manipulating the switching instants of the OPP. For example, EP 2 469 692 A1 describes such a method, in which switching instants of an optimized pulse pattern are modified to reduce a flux error.

However, $MP^3C$ is usually only applicable to first-order systems, such as electrical machines. For these, the stator flux in the orthogonal coordinate system is the integral of the applied converter voltage (when neglecting the voltage drop due to the stator resistance). When considering higher-order systems, such as converters with LC filters, the internal model of $MP^3C$ may not capture the resonant behaviour of the power converter circuit. To account for this, $MP^3C$ may need to be augmented by an additional damping term in its cost function or an outer damping loop must be added. Whilst these approaches may be effective during steady-state operation, the performance during large transients may be rather poor. More specifically, to avoid exciting the filter resonance too strongly, large reference step changes may have to be filtered by a ramp-limiter, resulting in a sluggish step response.

WO 2016/134874 A1 relates to time shifting of switching instants of an optimized pulse pattern. The time shifting is done with model predictive control, in which an objective function based on a flux error is minimized.

The following articles relate to converter control based on model predictive control and mention linearization of optimization problems:

Quevedo et al: "Model Predictive Control for Power Electronics Applications" In: "Handbook of Model Predictive Control", 30 Nov. 2018 (2018-11-30), Springer International Publishing, pages 551-580

Geyer et al: "Hybrid Model Predictive Control of the Step-Down DC-DC Converter", IEEE TRANSACTIONS ON CONTROL SYSTEMS TECHNOLOGY, IEEE SERVICE CENTER, NEW YORK, N.Y., US, vol. 16, no. 6, 1 Nov. 2008, pages 1112-1124

Cairano et al: "Model predictive controller matching: Can MPC enjoy small signal properties of my favorite linear controller?", 2009 EUROPEAN CONTROL CONFERENCE (ECC), IEEE, 23 Aug., 2009, pages 2217-2222

BRIEF DESCRIPTION

The present disclosure provides a controller for an electrical converter based on optimized pulse pattern, which also has a good performance during transient operations and/or which can be used for converter systems being higher-order physical systems.

Further exemplary embodiments are evident from the dependent claims and the following description.

An aspect of the present disclosure relates to a method for controlling an electrical converter system. In particular, the method may be applied to a converter system including an electrical converter and a further component supplied by the converter, such as an electrical machine, a resonant subsystem and/or a cable with high impedance. The resonant subsystem may be a filter, such as an LC or LCL filter. As already mentioned, LC filters may result in a mathematical model of higher order, which may be addressed with the present method. The method may be automatically performed by a controller of the converter system.

According to an embodiment of the present disclosure, the method includes: determining a nominal pulse pattern and a reference trajectory of at least one electrical quantity of the electrical converter system over a horizon of future sampling instants, wherein the nominal pulse pattern and the reference trajectory are determined from a table of optimized pulse patterns, the nominal pulse pattern includes switching transitions between output voltages of an electrical converter of the electrical converter system and the reference trajectory indicates a desired future development of an electrical quantity of the converter system;

A pulse pattern may include switching instants and an output level of a phase of the converter at the switching instant. The pulse pattern and all quantities mentioned below may be multi-phase quantities, i.e. may have values for every phase of the converter system.

A switching instant may be a time, at which the converter is switched. A sampling instant may be a time, for which future quantities in the controller are calculated. For example, sampling instants may be equidistant with respect to each other. A switching instant may be situated between two sampling instants.

The nominal pulse pattern may be determined by the controller online from a lookup table of offline optimized pulse patterns, which may have been determined with respect to an optimization goal for steady-state operation.

Furthermore, for one electrical quantity or multiple electrical quantities of the converter system reference trajectories may be determined. The electrical quantities may include a converter current, a grid current, a filter capacitor voltage, etc. In general, an electrical quantity may be a current and/or voltage and/or flux of a component of the converter system.

This may be done by extrapolating the quantities from actual values, which may have been determined from measurements, into the future. The extrapolation may be done with a mathematical model of the converter, which may include differential equations for the quantities. It also may be that the reference trajectories already have been determined offline for the optimized pulse patterns and are read from a lookup table.

According to an embodiment of the present disclosure, the method further includes: determining a small-signal pulse pattern by minimizing a cost function, which cost function includes a small-signal error, which is based on a difference of the reference trajectory and the predicted trajectory. The small-signal pulse pattern may encode an instantaneous voltage-time impulse at each switching transition of the nominal pulse pattern. The position in time of the impulse is given by the switching instant, whereas the amplitude or strength of the impulse relates to a voltage-time area when modifying this switching transition. The predicted trajectory may be determined over the horizon from measurements in the converter system and from a model of the converter system, into which a sum of the nominal pulse pattern and the small-signal pulse pattern are input and/or inputs.

The cost function may be a function of the small-signal pulse pattern and in particular it may be a function of the instantaneous voltage-time impulses, which may be encoded with a set of voltage-time values. The cost function may be a quadratic function of these voltage-time values.

The small-signal error may be determined from a difference of the reference trajectory and a predicted trajectory. More specifically, at future time steps differences of values of these trajectories are determined and a weighted norm of these differences quantifies the result as a scalar. The cost function may be determined to output the small-signal error.

The model, which may be seen as a mathematical and/or physical model of the converter system, may model differential equations of quantities of the converter system, such as a converter current, a capacitor voltage, a grid current, a machine current, a flux, etc. The differential equations may be processed in the form of difference equations. In general, the quantities may include currents and/or voltages and/or fluxes of components of the converter system. The cost function may be composed of quantities, which are determined based on the mathematical model. These quantities may be assembled into matrices and/or vectors, which are used in the cost function.

All these quantities may be seen as trajectories over time. For each quantity, sequences of values over time, i.e. trajectories, may be determined.

It may be that the prediction and/or optimization takes place with respect to constraints, such as minimal and maximal voltages and/or currents for specific components of the converter, such as a DC link voltage, a magnitude of an output current and/or output voltage of the converter, etc.

The prediction and/or optimization may lead to a quadratic program, which is implemented in the controller. In this case, the controller solves equations of matrices and vectors, which have been filled before, based on measurements, the reference trajectory and/or the small-signal pulse pattern before.

According to an embodiment of the present disclosure, the method further includes: determining a modified pulse pattern by moving the switching transitions of the nominal pulse pattern, wherein a switching transition is moved by a time interval, such that the time interval multiplied with a direction of the switching transition equals the voltage-time value at the switching transition. In other words, the strengths of the impulses are equal to the voltage-time areas that are added to the nominal pulse pattern to obtain the modified pulse pattern. Here, the direction of the switching transition may refer to a voltage difference and/or a sign of this voltage difference defined by the switching transition.

In this way, not the pulse pattern itself, but the small-signal pulse pattern is optimized, which may simplify the computational burden when solving the optimization problem significantly. Basically, using the small-signal pulse pattern may be seen as a linearization around the nominal switching instants.

According to an embodiment of the present disclosure, the method further includes: applying at least the next switching transitions of the modified pulse pattern within the sampling interval to the electrical converter system. It may be that a receding horizon policy is performed by the controller, i.e. that the modified pulse pattern and/or the small-signal pulse pattern is determined over a horizon of more than one sampling instant and that solely the next switching transition or the switching transitions up to the next sampling instant are applied to the converter.

In general, the method may be applied to any linear converter system with multiple state variables and integer switch positions, which is modulated by optimized pulse patterns. Both continuous and discontinuous switching angles may be used. The method may regulate the converter system states along their reference trajectories, may manipulate the switch positions (or, effectively, the switching instants and switching transitions) of the converter and may modulate the converter with a modified optimized pulse pattern. The modifications to the pulse pattern may be approximated with the strengths of voltage-time impulses, that is, the normalized volt-second contribution of the impulse. These impulses may be called voltage-time impulses herein. Their strengths may be called voltage-time values.

The usage of the small-signal pulse pattern may be seen as a linearization around the switching instants. As a result, the evolution of the state error may be described by a set of linear differential equations. The optimization problem encoded by the cost function and optionally further constraints may penalize a tracking error and optionally a deviation from the unmodified switching instants. It has to be noted that the optimization problem may be formulated as a convex quadratic program and thus may be computationally relatively easy to solve.

On the other hand, during steady-state operation, the superior harmonic performance of optimized pulse patterns may be achieved. Furthermore, during transients, disturbances and/or faults a fast response may be achieved. One example for this may be a superior low voltage ride-through capability.

Electrical resonances in the converter system may not be excited and/or any related oscillations may be to be actively damped.

The method may be insensitive to measurement and observer noise, and may be robust with respect to parameter uncertainties, such as unknown variations in the system parameters. Examples for this may include variations in inductors and/or capacitors of the converter system.

According to an embodiment of the present disclosure, the switching transitions of the modified pulse pattern during an actual and/or current sampling interval are applied to the electrical converter system. The small-signal pulse pattern and the modified pulse pattern may be determined during an actual and/or current sampling interval for a horizon of more than one future sampling interval. Only the switching transitions of the modified pulse pattern during the current sampling interval may be applied to the converter system.

According to an embodiment of the present disclosure, during the current sampling interval, the small-signal pulse pattern and the modified pulse pattern are determined again for a horizon starting with the next sampling interval. In other words, a receding horizon policy may be applied. The small-signal pulse pattern and the modified pulse pattern may be determined at every sampling interval for a horizon longer than one sampling interval.

According to an embodiment of the present disclosure, the cost function is a quadratic function in the voltage-time values, which are arranged into a vector of voltage-time values. The cost function may include a quadratic term with a model matrix, which is multiplied at both sides by the vector of voltage-time values and a linear term with a model vector multiplied by the vector of voltage-time values. The structure of the model matrix and the model vector may be determined offline, and/or online by inputting the measurements, the reference trajectory, and the small-signal pulse pattern into the mathematical model of the electrical converter.

According to an embodiment of the present disclosure, the model matrix and the model vector are determined from measurements in the converter, the reference trajectory, and the small-signal pulse pattern, such that the cost function encodes the small-signal error. With the known structure of the model matrix and the model vector, the values of the entries of the model matrix and the model vector can be determined online from measurements in the converter system, the reference trajectory, and the small-signal pulse pattern.

According to an embodiment of the present disclosure, the cost function additionally minimizes a magnitude of the voltage-time impulses, the voltage-time values. For example, the cost function may include a quadratic term with a penalty matrix, which is multiplied at both sides by the vector of voltage-time values. The penalty matrix may be a positive semidefinite matrix, which penalizes the voltage-time values of deviating from zero.

According to an embodiment of the present disclosure, the small-signal pulse pattern is determined by minimizing the cost function subject to constraints. These constraints may include constraints on voltages and/or currents in the converter system, in particular that these voltages and/or currents do not leave a bounding interval. A bounding interval may be defined by a constant minimum and a constant maximum.

According to an embodiment of the present disclosure, the voltage-time values of the small-signal pulse pattern are constrained, such that the modified switching transitions in a phase stay in the original order.

According to an embodiment of the present disclosure, the optimal small-signal pulse pattern is determined by solving a quadratic program into which the small-signal pulse pattern, the reference trajectory, and the measurements are input and/or are inputs. The quadratic program may be based on a cost function quadratic in the voltage-time values (such as describe above) and optionally constraints (such as mentioned above). At every sampling instant, the quadratic program may be solved numerically by the controller for determining the voltage-time values.

According to an embodiment of the present disclosure, the method further includes: determining an incumbent pulse pattern over the horizon, wherein the incumbent pulse pattern includes the modified switching transitions determined at the previous sampling instant and the remaining switching transitions of the nominal pulse pattern up to the horizon.

When the method already has determined a modified pulse pattern, the incumbent pulse pattern may be used instead of the nominal pulse pattern to optimize the voltage-time values of the small-signal pulse pattern. To enhance the accuracy of the approximations, the linearization at subsequent time steps may be done around the modified switching instants computed at the previous time step rather than around the switching instants of the nominal pulse pattern.

In particular, the predicted trajectory may be determined from the model of the converter system, into which a sum of the incumbent pulse pattern and the small-signal pulse pattern are the input. The model matrix and the model vector used for forming a quadratic cost function may be determined from the reference trajectory, the measurements, and the small-signal pulse pattern.

According to an embodiment of the present disclosure, the small-signal pulse pattern encodes instantaneous voltage-time impulses, which may be encoded by impulse strengths, at each switching transition of the incumbent pulse pattern. In other words, the time instants of the instantaneous voltage-time impulses of the small-signal pulse pattern are moved to the ones of the incumbent pulse pattern (instead of the nominal pulse pattern). This may enhance the accuracy of the linear approximations around the switching instants.

According to an embodiment of the present disclosure, a difference pulse pattern is determined, which encodes at least one rectangular voltage-time area to compensate a difference between the nominal pulse pattern and the incumbent pulse pattern. The difference pulse pattern may encode a rectangular voltage-time area at some or all switching transitions of the incumbent switching pattern. To account for the difference between the nominal pulse pattern and the incumbent pulse pattern, rectangular voltage-time areas may be included along with the small-signal pulse pattern. The difference pulse pattern may be the difference of the nominal pulse pattern and the incumbent pulse pattern determined at the previous sampling instant. The voltage time area at a switching transition may be equal to a difference of the time-instants of the nominal pulse pattern and the incumbent pulse pattern multiplied by the direction of the switching transition. It has to be noted that the rectangular voltage-time areas, which represent previous switching instant modifications, are not optimized but are used for compensating the differences between the nominal pulse pattern and the incumbent pulse pattern.

According to an embodiment of the present disclosure, the optimized pulse patterns and the reference trajectory are determined offline and stored in a lookup table. An optimized pulse pattern may be determined for each modulation index and each pulse number, which are used in the converter system. The actual modulation index and pulse number may be determined from actual reference values and/or measurements in the converter system.

The optimized pulse patterns may have been calculated offline with respect to a specific optimization goal, such as a minimal total demand distortion of the current during steady-state operation. The optimized pulse patterns may be stored in a lookup table in the controller.

One or more reference trajectories also may have been determined offline for the optimized pulse patterns. The values for these reference trajectories also may be stored in a lookup table in the controller.

Further aspects of the present disclosure relate to a computer program, which when executed by a processor is adapted for performing the method as described above and below and to a computer-readable medium, in which such a computer program is stored. The method may be implemented in software and may be run on a controller having a processor and a memory in which the computer program is stored.

A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer readable medium may also be a data communication network, e.g. the Internet, which allows downloading a program code. In general, the computer-readable medium may be a non-transitory or transitory medium.

A further aspect of the present disclosure relates to a controller for an electrical converter adapted for performing the method as described above and below. It has to be noted that the method also may be at least partially implemented in hardware, for example in a DSP or FPGA.

A further aspect of the present disclosure relates to a converter system, which includes an electrical converter interconnected with an electrical grid and a controller as described above and below.

According to an embodiment of the present disclosure, the converter system further includes a resonant subsystem including at least one of inductors and a filter. For example, the resonant subsystem may be an LC filter or a cable, which may have a high impedance. The model of the converter system used during the optimization of the cost function may include a model of the electrical converter and the resonant subsystem. In particular, the resonant subsystem may result in differential equations of higher order.

It has to be understood that features of the method as described in the above and in the following may be features of the converter system, computer program, the computer readable medium and the controller, as described in the above and in the following, and vice versa.

These and other aspects of the present disclosure will be apparent from and elucidated with reference to the embodiments described hereinafter.

BRIEF DESCRIPTION OF THE DRAWINGS

The subject matter of the present disclosure will be explained in more detail in the following text with reference to exemplary embodiments which are illustrated in the attached drawings.

In principle, identical parts are provided with the same reference symbols in the figures.

DETAILED DESCRIPTION

Figure 1:
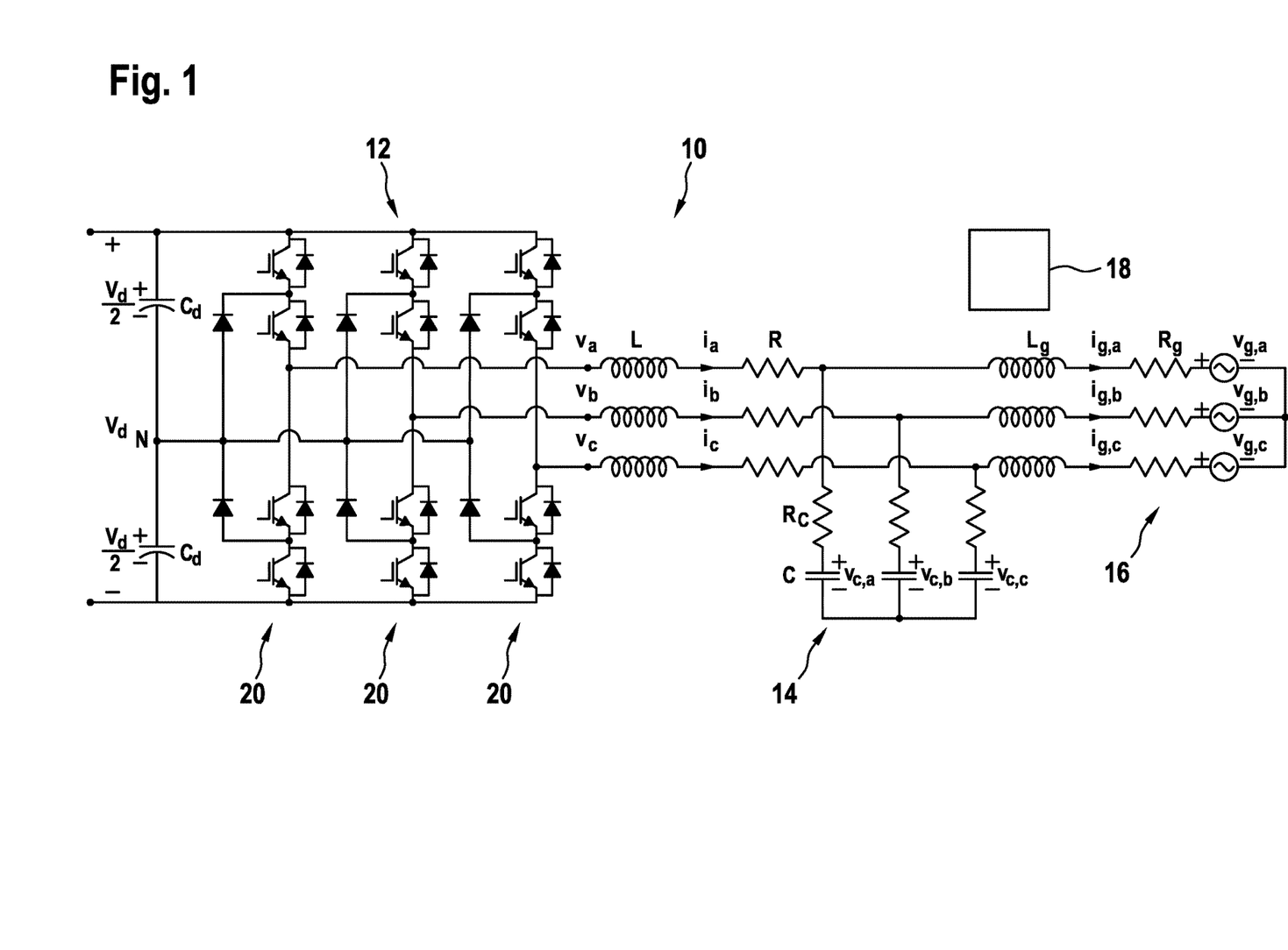
FIG. 1 schematically shows a converter system according to an embodiment of the present disclosure.

FIG. 1 shows a converter system 10 including an electrical converter 12 and an LC filter 14, which are coupled with an electrical grid 16. The further respective quantities shown in FIG. 1 are listed in the end of the present description. FIG. 1 also shows a controller 18, which is adapted for performing the method for controlling the converter system 10, as described herein.

The LC filter 14 may include filter inductors L and filter resistors R connected between the converter 12 and the grid 16, and filter resistors $R_C$ and filter capacitors C connected to the interconnection of the converter 12 and the grid 16.

As shown, the electrical converter 12 may be a neutral-point-clamped converter having a neutral-point-clamped phase leg 20 for each output phase. Other converters 12, such as T-type converters, modular multi-level converters and/or converters with flying capacitors may be used as multi-level converter 12. Also, two-level converters could be used.

Figure 2:
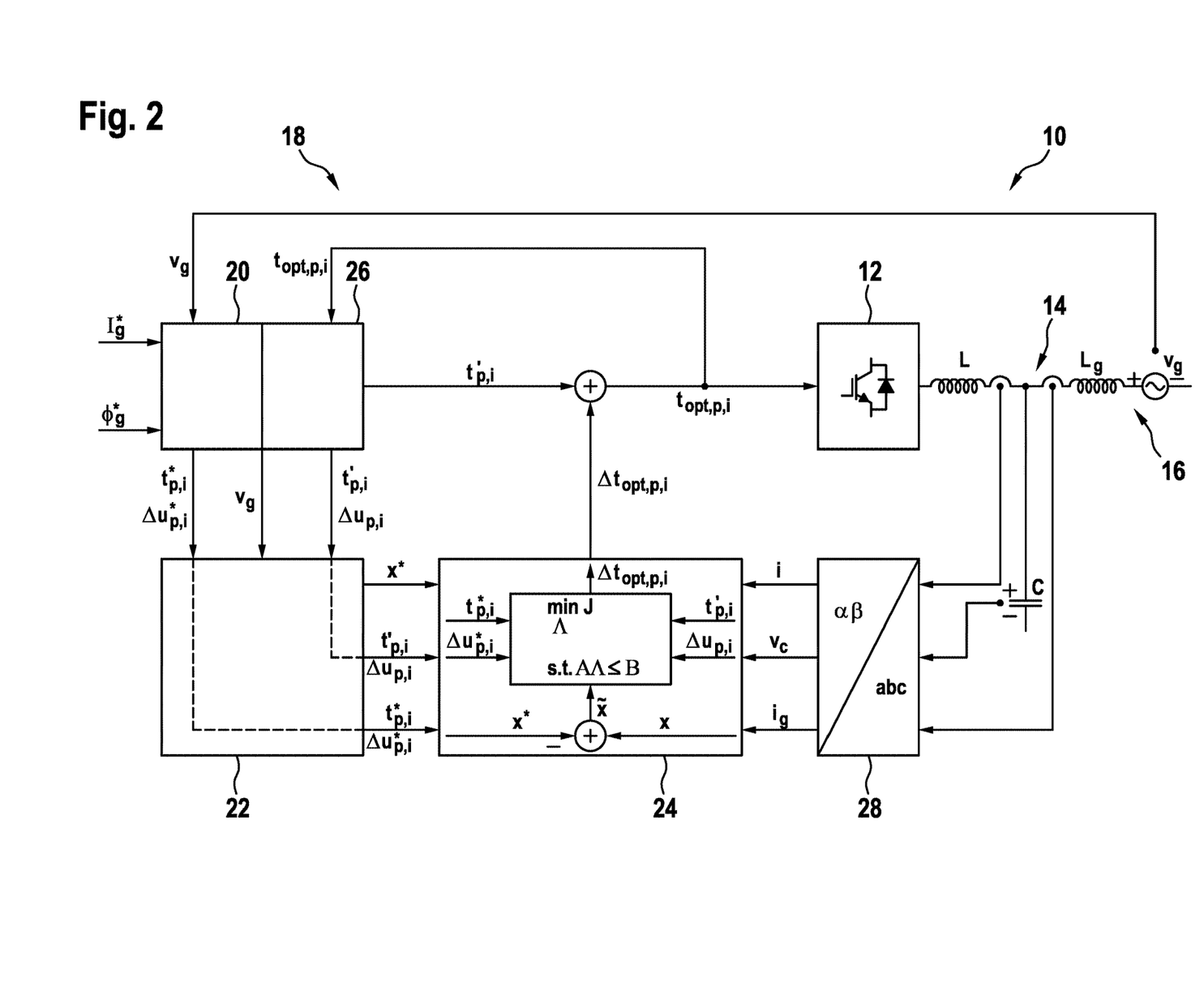
FIG. 2 shows a block diagram for a controller according to an embodiment of the present disclosure.

FIG. 2 is a further drawing of the system 10, where the controller 18 is shown in more detail. The controller 18 includes a pulse pattern selector 20, a reference trajectory generator 22, a small-signal optimizer 24, an incumbent pulse pattern determiner 26 and a Clarke transformation block 28.

A method for controlling the converter system 10, which may be automatically performed by the controller 18, will be explained with respect to the different blocks 20, 22, 24, 26, 28 in the following.

In a first step, depending on the grid voltage $v_g$, the grid current reference $I_g^*$ and the grid phase reference $\phi_g^*$, an appropriate optimized pulse pattern is selected by the pulse pattern selector 20. The pulse pattern selector 20 then provides the nominal switching instants $t_{p,i}^*$ and the nominal switching transitions $\Delta u_{p,i}^*$ of a nominal pulse pattern.

Offline computed OPPs are a specific pulse width modulation (PWM) method. Unlike carrier-based PWM or space vector modulation, OPPs abandon the notion of the fixed modulation interval with one switching transition per phase and modulation (half)interval. The removal of these restrictions facilitates the computation of optimal switching angles that minimize the harmonic current distortions for a given switching frequency.

The switching instants and switch positions of an OPP are typically computed for one phase over a quarter of a fundamental period, assuming quarter- and half-wave symmetry and a 120° phase shift between the three phases.

In a second step, the optimal state reference trajectory x* is generated by the reference trajectory generator 22 from the nominal pulse pattern $t_{p,i}^*$, $\Delta u_{p,i}^*$.

In summary, a nominal pulse pattern $t_{p,i}^*$, $\Delta u_{p,i}^*$ and at its corresponding reference trajectory x* of the electrical converter system 10 are determined over a horizon of future sampling instants, wherein the nominal pulse pattern $t_{p,i}^*$, $\Delta u_{p,i}^*$ and the corresponding reference trajectory x* are determined from a table of optimized pulse patterns. The nominal pulse pattern $t_{p,i}^*$, $\Delta u_{p,i}^*$, includes switching transitions $\Delta u_{p,i}^*$, between output voltages of an electrical converter 12 of the electrical converter system 10 and the reference trajectory x* indicates a desired future development of the electrical quantities of the converter system 10.

The optimized pulse patterns and optionally the reference trajectory x* may be determined offline and stored in lookup tables in block 20 and block 22, respectively.

In a third step, the small-signal optimizer 24 receives measurement values, such as the converter current i, the filter capacitor voltage $v_c$ and the grid current $i_g$, which have been measured in the system 10 and which have been Clarke transformed by block 28.

The Clarke Transformation $$\xi_{\alpha\beta}=K\xi_{abc} \tag{1}$$

maps any variable $\xi_{abc}=[\xi_a \xi_b \xi_c]^T$ in the abc-plane to the two-dimensional vector $\xi_{\alpha\beta}=[\xi_\alpha \xi_\beta]^T$ in the αβ-plane via the transformation matrix $$K = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix}.$$

Herein, all variables in the abc-plane are denoted by their corresponding subscript, whereas the subscript is dropped for those in the $\alpha\beta$-plane.

From the measurements, the small-signal optimizer 24 calculates an initial small-signal error, $\tilde{x}_0 = x_0 - x_0^*$. It then builds the Hessian H with the help of (44), see below, and the model vector c with the help of (50) and (51). By solving the QP (61), the vector of optimal impulse strengths $\Lambda_{opt}$ is found.

A small-signal pulse pattern $\tilde{u}_{abc}(t, \lambda_{p,i})$, which may be provided as a vector of optimal impulse strengths $\Lambda_{opt}$, is determined by minimizing a cost function, which cost function includes a small-signal error, which is based on a difference of the reference trajectory $x^*$ and the predicted trajectory $x$. The impulse strengths $\lambda_{p,i}$ of the small-signal pulse pattern $\tilde{u}_{abc}(t, \lambda_{p,i})$ encode a voltage-time value $\lambda_{p,i}$ at each switching transition of the nominal pulse pattern $t_{p,i}^*$, $\Delta u_{p,i}^*$, and wherein the predicted trajectory $x$ is determined over the horizon from measurements $i$, $v_c$, $i_g$ in the converter system and from a model of the converter system 10, into which a sum of the nominal pulse pattern $t_{p,i}^*$, $\Delta u_{p,i}^*$, and small-signal pulse pattern $\tilde{u}_{abc}(t, \lambda_{p,i})$ are input and/or are inputs.

After that, in a fourth step, the strengths $\lambda_{p,i}$ are translated back to the switching instant modifications $\Delta t_{opt,p,i}$ by the small-signal optimizer 24, which are then added to the switching instants $t_{p,i}^*$ of the nominal pulse pattern or to the switching instants $t_{p,i}'$ of the incumbent pulse pattern (see below) to determine the modified switching instants $t_{opt,p,i}$ of the modified pulse pattern, in accordance with (63).

A modified pulse pattern $t_{opt,p,i}$, $\Delta u_{p,i}$ is determined by moving the switching transitions of the nominal pulse pattern $t_{p,i}^*$, $\Delta u_{p,i}^*$, wherein a switching transition is moved by a time interval, such that the time interval times a direction of the switching transition equals the voltage-time value that the impulse strength $\lambda_{p,i}$ encodes at the nominal switching transition.

Only the switching transitions of the modified pulse pattern $t_{opt,p,i}$, $\Delta u_{p,i}$ within the sampling interval are then applied to the electrical converter 12.

Optionally, it may be that the method also uses an incumbent pulse pattern $t_{p,i}'$, $\Delta u_{p,i}$ instead of the nominal pulse pattern in the small-signal optimizer 24.

In this case, the modified switching instants $t_{p,i}'$ and the switching transitions $\Delta u_{p,i}$ determined at a sampling instant are stored as the incumbent pulse pattern by block 26. The incumbent pulse pattern $t_{p,i}'$, $\Delta u_{p,i}$ is updated at each sampling instant. At the subsequent sampling instant, the incumbent switching pattern $t_{p,i}'$, $\Delta u_{p,i}$ is an input (instead of the nominal pulse pattern) into the optimizer 24.

In summary, an incumbent pulse pattern $t_{p,i}'$, $\Delta u_{p,i}$ is determined over the horizon, wherein the incumbent pulse pattern $t_{p,i}'$, $\Delta u_{p,i}$ includes the modified switching transitions $t_{opt,p,i}$ determined at the previous sampling instant and the remaining switching transitions of the nominal pulse pattern $t_{p,i}^*$, $\Delta u_{p,i}^*$ up to the horizon. In the optimizer 24, the predicted trajectory $x$ is determined from the model of the converter system 10, into which a sum of the incumbent pulse pattern $t_{p,i}'$, $\Delta u_{p,i}$ and small-signal pulse pattern $\tilde{u}_{abc}(t, \lambda_{p,i})$ is the input.

The above steps may be repeated at each sampling instant. Note that the first two steps may be only required, if the operating conditions of the converter system 10 change.

Figure 3A:
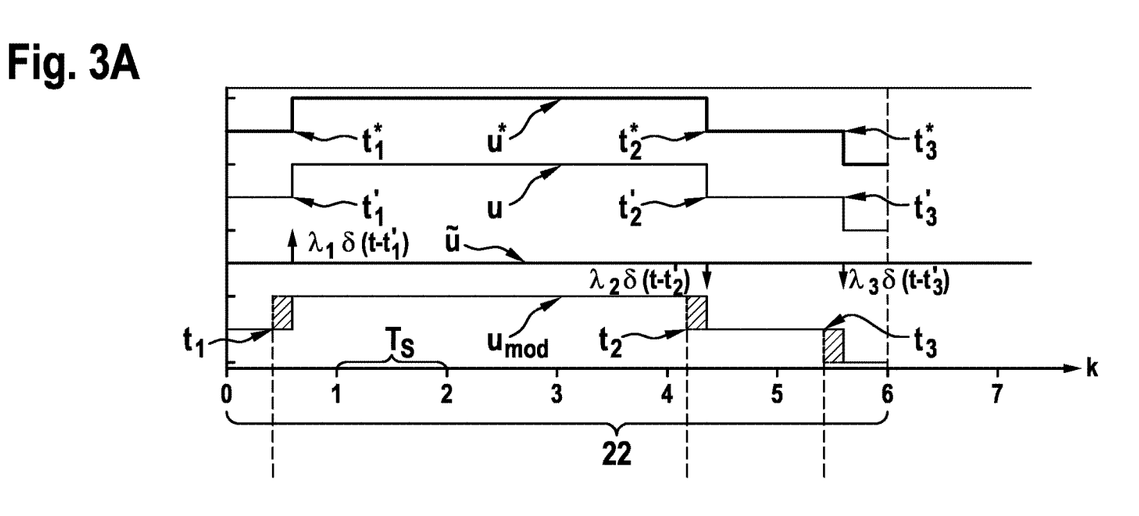
FIGS. 3A and 3B show pulse patterns, which are used in a method according to an embodiment of the present disclosure.
Figure 3B:
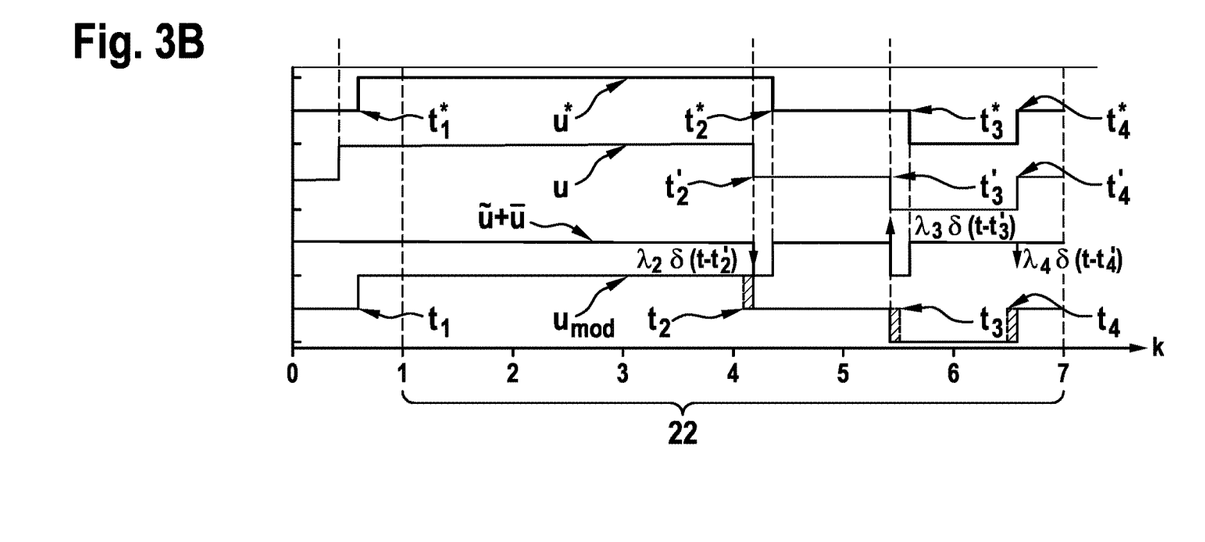

In the method, several types of pulse patterns are used, which are shown in FIGS. 3A and 3B.

The nominal pulse pattern $u^*$ is determined from the offline calculated optimized pulse pattern. The three-phase nominal pulse pattern is denoted by $u_{abc}^*(t)$. Its switching transitions occur at time instants $t_{p,i}^*$.

The incumbent pulse pattern $u$ may be used by the controller 18 as a starting point, i.e. the pulse pattern whose switching transitions are modified. The three-phase incumbent pulse pattern is denoted by $u_{abc}(t)$. Its switching transitions occur at $t_{p,i}'$.

The impulse strengths (or voltage-time values) $\lambda_{p,i}$ of the small-signal pulse pattern $\tilde{u}$ are optimized by the small-signal optimizer 24. The small-signal pulse pattern $\tilde{u}$ includes a train of Dirac delta functions (also known as impulses) at switching instants $t_{p,i}'$ with impulse strengths $\lambda_{p,i}$.

The modified pulse pattern $u_{mod}$ results from the optimizer, and its first part (within the sampling interval) is applied to the converter 12. The three-phase modified pulse pattern is denoted by $u_{mod,abc}(t)$. Its switching transitions occur at $t_{p,i} = t_{p,i}' + \Delta t_{p,i}$.

As shown in FIGS. 3A and 3B, the controller 18 operates at discrete time steps $kT_s$, where $k \in \mathbb{N}$, and $T_s$ is the sampling interval, such as 25 μs. Note that, even though the controller 18 operates at discrete time instants $kT_s$, the switching instant modification may be formulated in the continuous-time domain. This implies that the modified switching instants are real-valued quantities.

The pulse patterns $u^*$, $u$ and $\tilde{u} + \bar{u}$ are only determined for a prediction horizon 22. Out of the prediction horizon 22, only the modified switching instants within the current sampling interval are applied, that is, between $kT_s$ and $(k+1)T_s$. Then, at each subsequent sampling instant, the modified switching instants from the previous sample (which are now the incumbent switching instants) are re-optimized based on new information. This may be called receding horizon policy, which provides feedback and may make the controller robust to disturbances and modelling errors.

Converter System

Converter systems 10 are considered, which include linear elements and switching elements. The switch positions of the switching elements can be described by integer variables. Typical linear elements are voltage and current sources, ohmic resistances, capacitors and inductors. Because inductors and ohmic resistances are the building blocks of transformers and rotating electrical machines, these also may be part of the converter system 10.

A converter system 10 with linear elements and integer inputs can be described by the continuous-time state-space representation $$\frac{dx(t)}{dt} = Fx(t) + Gu_{abc}(t) + Pv_g(t), \quad (2)$$

where $x \in \mathbb{R}^{n_x}$ and $v_g \in \mathbb{R}^{n_v}$ are the state and parameter vectors in the $\alpha\beta$ reference frame, respectively, with $n_x \in \mathbb{N}^+$ and $n_v \in \mathbb{N}_0^+$. The input vector $u_{abc} = [u_a \ u_b \ u_c]^T \in \mathbb{Z}^3$ is the three-phase switch position. Finally, F, G, and P are the state, input and parameter matrices, which characterize the converter system 10.

The formulation in (2) is sufficiently general to include any converter topology, including dc/ac, ac/dc, dc/dc and ac/ac converters, two-level, three-level and general multi-level converters, and voltage-source as well as current-source converters. By adapting the dimension of the input vector $u_{abc}$, converters with a wide range of phase configurations can be addressed, including single-phase, three-phase and multi-phase converters.

As an embodiment, consider an NPC converter 12 connected to the grid 16 via an LC filter 14, as shown in FIG. 1. The phase voltages are denoted by $v_p$, where $p \in \{a,b,c\}$ are the three phases. Assume that the dc-link capacitors have an infinite capacitance, and that the neutral point N is fixed, dividing the dc-link voltage $V_d$ evenly across the dc-link capacitors. Each phase leg can synthesize three voltage levels:

$$-\frac{V_d}{2}, 0, \frac{V_d}{2}.$$

Thus, the output voltage for a particular phase is given by $$v_p = \frac{V_d}{2} u_p, \quad (3)$$

where $u_p \in \{-1,0,1\}$ represents the switch position of the particular phase.

The three-phase grid voltages are assumed to be symmetrical, and its phase voltages are shifted by 120° with respect to each other with a positive phase sequence. The stationary orthogonal reference frame can be defined by the grid voltage $$v_g(t) = \begin{bmatrix} v_{g,\alpha}(t) \\ v_{g,\beta}(t) \end{bmatrix} = \sqrt{\frac{2}{3}} V_{g,LL} K \begin{bmatrix} \sin(\omega_1 t) \\ \sin\left(\omega_1 t - \frac{2\pi}{3}\right) \\ \sin\left(\omega_1 t + \frac{2\pi}{3}\right) \end{bmatrix},$$

where $V_{g,LL}$ is the root-mean-square (rms) line-to-line grid voltage, and $\omega_1$ is the fundamental angular frequency.

Also the three-phase converter current $i_{abc}=[i_a\ i_b\ i_c]^T$, the three-phase capacitor voltage $v_{c,abc}=[v_{c,a}\ v_{c,b}\ v_{c,c}]^T$ of the LC filter, and the three-phase grid current $i_{g,abc}=[i_{g,a}\ i_{g,b}\ i_{g,c}]^T$ may be defined. These quantities are transformed into the stationary orthogonal reference frame with the Clarke transformation (1).

Based on this, the state vector is defined as $$x(t)=[i_\alpha(t) i_\beta(t) i_{g,\alpha}(t) i_{g,\beta}(t) v_{c,\alpha}(t) v_{c,\beta}(t)]^T$$

and the converter system can be written in the continuous-time state-space form (2). The corresponding matrices are given as $$F = \begin{bmatrix} -\frac{R+R_C}{L} I_2 & \frac{R_C}{L} I_2 & -\frac{1}{L} I_2 \\ \frac{R_C}{L_g} I_2 & -\frac{R_g+R_C}{L_g} I_2 & \frac{1}{L_g} I_2 \\ \frac{1}{C} I_2 & -\frac{1}{C} I_2 & 0_{2\times 2} \end{bmatrix},$$

$$G = \frac{V_d}{2L} \begin{bmatrix} I_2 \\ 0_{2\times 2} \\ 0_{2\times 2} \end{bmatrix} K, \text{ and } P = \frac{1}{L_g} \begin{bmatrix} 0_{2\times 2} \\ -I_2 \\ 0_{2\times 2} \end{bmatrix}.$$

In here, $I_2$ denotes the 2×2 identity matrix, and $0_{2\times 2}$ is a 2×2 zero matrix. The grid voltage $v_g$ is treated as a time-varying parameter to the system. Note that the input $u_{abc}$ is given in the three-phase abc frame, whereas the state vector x and the parameter vector $v_g$ are given in the stationary orthogonal $\alpha\beta$ reference frame.

Control Problem

The control problem at hand is to regulate the state variables x of the power converter system (2) along a suitable state reference x*. In general, state variables include voltages, currents, fluxes and power of the converter, filter, load, grid or electrical machine. In doing so, the real and reactive power of the converter, its dc-link voltage or current, internal converter quantities such as neutral-point potential or a flying capacitor voltage, and the grid or load can be controlled. Typical load quantities to be controlled are the electromagnetic torque and the magnetization of an electrical machine, the phase currents of a load, or the real and reactive power of a load. Any converter topology can be considered, including single-phase, three-phase, multi-phase, dc/ac, ac/dc, dc/dc, and ac/ac converters. Two-level, three-level and general multilevel converter can be addressed, and voltage-source and current-source converters may be considered.

In order to minimize the harmonic distortions and the switching frequency, optimized pulse patterns (OPPs) with discontinuous switching angles may be used to modulate the converter switches. OPPs lack a fixed modulation interval. Therefore, regularly spaced time instants, and thus sampling instants, do not exist at which the ripple on the state variables is zero. This implies that when sampling the state quantities at regularly spaced time instants, the sum of the fundamental component with its ripple component will be measured. This significantly complicates the controller design.

The present control method described herein regulates the states of a linear multiple-input multiple-output system with integer inputs along its reference trajectories, manipulates the switch positions of the converter, modulates the converter with OPPs during steady-state operation to achieve a superior harmonic performance at a low switching frequency, achieves fast responses with little overshoots during reference step changes, and rejects unmeasured disturbances.

Small-Signal Modifications of the OPP Switching Instants
Small-Signal Corrections Firstly, solely FIG. 3A is considered. To simplify the notation, the phase p is dropped from the variables. The nominal pulse pattern is denoted with u*(t). The nominal pulse pattern has n* switching transitions that occur at the (nominal) switching instants $t_i^*$, i=1, ..., n*, and can be represented as $$u^*(t) = u_0^* + \sum_{i=1}^{n^*} \Delta u_i^* h(t - t_i^*),$$

where h(t) is the Heavyside step function and $u_0^*$ is the initial (nominal) switch position.

The pulse pattern that may be optimized, i.e. the pulse pattern whose switching transitions are modified, is called the incumbent pulse pattern, and it is denoted with u(t). The incumbent pulse pattern can be represented as $$u(t) = u_0 + \sum_{i=1}^{n} \Delta u_i h(t - t_i'), \quad (5)$$

where the switching transitions $t_i$ are referred to as the incumbent switching instants.

The pulse pattern that will be applied to the power converter is denoted with $u_{mod}(t)$ and is referred to as the modified pulse pattern. The modified pulse pattern has n switching transitions that occur at the modified switching instants $$t_i = t_i' + \Delta t_i \quad (6)$$

for i=1, ..., n, and where $\Delta t_i$ is the time modification. It can be observed that the ith switching instant modification is associated with an area of $$\lambda_i = -\Delta t_i \Delta u_i \quad (7)$$

that is removed or added to the incumbent pulse pattern. This area is proportional to a voltage-time area. The modified pulse pattern may be represented by $$u_{mod}(t) = u_0 + \sum_{i=1}^{n} \Delta u_i h(t - (t_i' + \Delta t_i)). \quad (8)$$

Recall that the time derivative of the step function h(t) is the Dirac delta function, or simply the impulse, $\delta(t)$. By using a first-order Tayler series expansion of the step functions around the incumbent switching instants $t_i'$, (8) can be approximated by $$u_{mod}(t) \approx u_0 + \sum_{i=1}^{n} \Delta u_i (h(t - t_i') - \Delta t_i \delta(t - t_i')). \quad (9)$$

With the definitions of (5) and (7), (9) simplifies to $$u_{mod}(t) \approx u(t) + \sum_{i=1}^{n} \lambda_i \delta(t - t_i'). \quad (10)$$

The (linearized) modified pulse pattern in (10) includes two terms. The first one is the (unmodified) incumbent pulse pattern u(t), whereas the second expression $$\tilde{u}(t) = \sum_{i=1}^{n} \lambda_i \delta(t - t_i') \quad (11)$$

states the (approximated) modifications. These modifications are impulses at the incumbent switching instants $t_i'$ with strengths $\lambda_i$, and the strengths may be seen as representing (rectangular) voltage-time areas.

This gives rise to a train of voltage-time impulses that will be an input to a small-signal model, as describe below. Based on this model, the model predictive controller of the optimizer 24 will adjust the impulse strengths $\lambda_i$ of the small-signal pulse pattern as required. By rewriting (7), the impulse strengths can be translated into the switching instant modifications $$\Delta t_i = -\frac{\lambda_i}{\Delta u_i}. \quad (12)$$

The translation from impulse strengths to switching instant modification is based on the linearization in (10). More specifically, the (shaded) rectangular voltage-time areas in FIGS. 3A and 3B are approximated by the strengths of the voltage-time impulses. The narrower the voltage-time areas, the better the approximation.

Updating the Incumbent Switching Instants

Since the modifications to the pulse pattern of (10) are based on approximating rectangular voltage-time areas with impulse strengths, the influence of the modifications on the behavior of the system states will as a rule only be accurate for small modifications (i.e. small impulse strengths) to the switching instants. However, using impulse strengths to model corrections will result in the underlying optimization problem of the control algorithm to be a convex QP. If impulse strengths were not used to model corrections, and therefore no linearization step was used, the optimization problem would be substantially more difficult and time consuming to solve. To address this issue, the optimization problem is formulated around the switching instants computed at the previous time step, rather than the nominal switching instants. This ensures a convex QP and highly accurate predictions during steady-state operation within a few sampling instants after a step-like transient.

The small-signal input is defined as the difference between the modified pulse pattern and the nominal pulse pattern, $$u_{mod}(t) - u^*(t) = u(t) - u^*(t) + \tilde{u}(t) \quad (13)$$

$$= \bar{u}(t) + \tilde{u}(t). \quad (14)$$

The small-signal input $\bar{u}(t) + \tilde{u}(t)$ includes two terms.

The first term $\bar{u}(t) = u(t) - u^*(t)$ refers to the difference between the incumbent pulse pattern and the nominal pulse pattern. This term is called small-signal difference pulse pattern, or small-signal difference input, and/or may be composed of voltage-time areas.

The second term $\tilde{u}(t)$ refers to the train of voltage-time impulses, which may be called small-signal pulse pattern.

In FIG. 3A, the switching instants of the nominal pulse pattern and the incumbent pulse pattern are equal ($t_i' = t_i^*$). This results in the small-signal input only containing voltage-time impulses $\tilde{u}(t)$ as defined in (11) and depicted in FIG. 3A. The controller 18 then calculates the impulse strengths, which are then translated to the modified switching instants $t_i$ (of the modified pulse pattern) using (6) and (12).

At the subsequent step in FIG. 3B, the incumbent switching instants $t_i'$ are updated with the modified switching instants $t_i$ computed at the previous time step k−1 (i.e. the modified switching instants shown in FIG. 3A). The small-signal input now contains additional terms, which are the actual (rectangular) voltage-time areas from the previous correction, alongside the voltage-time impulses, i.e., $$\bar{u}(t) + \tilde{u}(t) = \quad (15)$$

$$(u_0 - u_0^*) + \left( \sum_{i=1}^{n} \Delta u_i h(t - t_i') - \sum_{i=1}^{n^*} \Delta u_i^* h(t - t_i^*) \right) + \sum_{i=1}^{n} \lambda_i \delta(t - t_i').$$

This is illustrated in FIG. 3B. Note that all terms in (15), except for the last one, refer to the small-signal difference pulse pattern $\bar{u}(t)$.

Three-Phase Case

The previous sections are generalized to the three-phase case. The modification of the ith switching instant in phase p, with p∈ {a, b, c}, is defined as $$\Delta t_{p,i} = t_{p,i} - t_{p,i}', \tag{16}$$

where $t_{p,i}$ denotes the modified switching instant, and $t_{p,i}'$ is the incumbent switching instant. The corresponding switching transition is defined as $$\Delta u_{p,i} = u_{p,i} - u_{p,i-1} \tag{17}$$

from $u_{p,i-1}$ to $u_{p,i}$, where $u_{p,i-1}$ and $u_{p,i} \in \mathbb{Z}$. Generalizing (7), the ith pulse strength in phase p is defined as $$\lambda_{p,i} = -\Delta t_{p,i} \Delta u_{p,i}. \tag{18}$$

Consider the modified three-phase pulse pattern $u_{mod,abc}$(t) over the time interval $t \in [0, T_p]$, where $T_p$ is the prediction horizon of the to-be-designed controller. Following the principle derived in (10), the modified pulse pattern is defined as the superposition $$u_{mod,abc}(t) \approx u_{abc}(t) + \tilde{u}_{abc}(t, \lambda_{p,i}) \tag{19}$$

of the incumbent three-phase pulse pattern $$u_{abc}(t) = \begin{bmatrix} u_a(t) \\ u_b(t) \\ u_c(t) \end{bmatrix} = \begin{bmatrix} u_{a,0} + \sum_{i=1}^{n_a} \Delta u_{a,i} h(t - t'_{a,i}) \\ u_{b,0} + \sum_{i=1}^{n_b} \Delta u_{b,i} h(t - t'_{b,i}) \\ u_{c,0} + \sum_{i=1}^{n_c} \Delta u_{c,i} h(t - t'_{c,i}) \end{bmatrix} \tag{20}$$

and the three-phase modification (i.e. the three-phase small-signal pulse pattern)

$$\tilde{u}_{abc}(t, \lambda_{p,i}) = \begin{bmatrix} \tilde{u}_a(t, \lambda_{a,i}) \\ \tilde{u}_b(t, \lambda_{b,i}) \\ \tilde{u}_c(t, \lambda_{c,i}) \end{bmatrix} = \begin{bmatrix} \sum_{i=1}^{n_a} \delta(t - t'_{a,i})\lambda_{a,i} \\ \sum_{i=1}^{n_b} \delta(t - t'_{b,i})\lambda_{b,i} \\ \sum_{i=1}^{n_c} \delta(t - t'_{c,i})\lambda_{c,i} \end{bmatrix} \tag{21}$$

in the form of a train of weighted voltage-time impulses. In here, $n_p$ is introduced as the number of switching transitions in phase p that fall within the horizon $T_p$ and $\lambda_{p,i}$ as the strength of the ith impulse in that phase. Note that the incumbent switching instants $t_{p,i}'$, are defined relative to the current time step $t_0=0$. The total number of switching transitions in the three phases within the horizon $T_p$ is denoted by $n_{sw} = n_a + n_b + n_c$.

Internal Dynamic Model

Recall the differential equation of the power converter system in (2). The modified three-phase pulse pattern $u_{mod,abc}(t)$ is used as the input to this system. By integrating (2), the future state vector at time $t \in [0, T_p]$ is $$x(t) = e^{Ft} x_0 + \int_0^t e^{F(t-r)} G u_{mod,abc}(r) dr + \int_0^t e^{F(t-r)} P v_g(r) dr, \tag{22}$$

where $x_0$ is the initial state at time $t_0=0$. Similarly, the optimal state reference trajectory during steady-state operation follows from the nominal pulse pattern as $$x^*(t) = e^{Ft} x_0^* + \int_0^t e^{F(t-r)} G u_{abc}^*(r) dr + \int_0^t e^{F(t-r)} P v_g(r) dr, \tag{23}$$

where $x_0^*$ is the optimal initial state and $$u_{abc}^*(t) = \begin{bmatrix} u_a^*(t) \\ u_b^*(t) \\ u_c^*(t) \end{bmatrix} = \begin{bmatrix} u_{a,0}^* + \sum_{i=1}^{n_a^*} \Delta u_{a,i}^* h(t - t_{a,i}^*) \\ u_{b,0}^* + \sum_{i=1}^{n_b^*} \Delta u_{b,i}^* h(t - t_{b,i}^*) \\ u_{c,0}^* + \sum_{i=1}^{n_c^*} \Delta u_{c,i}^* h(t - t_{c,i}^*) \end{bmatrix}. \tag{24}$$

The error between the actual state and its reference $$\tilde{x}(t) = x(t) - x^*(t) \tag{25}$$

is the so-called small-signal error, $\tilde{x} \in \mathbb{R}^{n_x}$. By inserting (23) and (22) with (19) into (25), the expression $$\tilde{x}(t, \lambda_{p,i}) \approx \tag{26}$$

$$e^{Ft} \tilde{x}_0 + \int_0^t e^{F(t-r)} G(u_{abc}(r) - u_{abc}^*(r)) dr + \int_0^t e^{F(t-r)} G \tilde{u}_{abc}(r, \lambda_{p,i}) dr$$

is obtained, where $\tilde{x}_0 = x_0 - x_0^*$ is the initial small-signal error. Because the expression (19) only holds approximately, the small-signal error in (26) is also an approximation. Note that the state error $\tilde{x}(t, \lambda_{p,i})$ is a function of the impulse strengths $\lambda_{p,i}$, which model the modifications to the incumbent pulse pattern. The grid voltage is not part of the small-signal model in (26), but the grid voltage will be required by the controller when selecting the appropriate pulse pattern.

State Error in Vector Form

The small-signal error (26) can be written in a compact form. To this end, in (26) the small-signal pulse pattern $\tilde{u}_{abc}(t, \lambda_{p,i})$ is rearranged, see (21), resulting in $$\tilde{x}(t, \lambda_{p,i}) \approx e^{Ft} \tilde{x}_0 + \Gamma(t) + \int_0^t e^{F(t-r)} \tag{27}$$

$$G\left(\begin{bmatrix} 1 \\ 0 \\ 0 \end{bmatrix} \sum_{i=1}^{n_a} \delta(r - t'_{a,i})\lambda_{a,i} + \begin{bmatrix} 0 \\ 1 \\ 0 \end{bmatrix} \sum_{i=1}^{n_b} \delta(r - t'_{b,i})\lambda_{b,i} + \begin{bmatrix} 0 \\ 0 \\ 1 \end{bmatrix} \sum_{i=1}^{n_c} \delta(r - t'_{c,i})\lambda_{c,i}\right)$$

$$dr, \text{ where}$$

$$\Gamma(t) = \int_0^t e^{F(t-r)} G(u_{abc}(r) - u_{abc}^*(r)) dr. \tag{28}$$

Manipulations involving $\Gamma(t)$ are moved to Appendix A. By using the well-known sifting property of the impulse, $$\int_{-\infty}^t f(r) \delta(r - t'_{pi}) dr = f(t'_{pi}) h(t - t'_{pi}),$$

the integral in (27) turns into $$\tilde{x}(t, \lambda_{p,i}) \approx e^{Ft} \tilde{x}_0 + \Gamma(t) + \sum_{i=1}^{n_a} e^{F(t - t'_{a,i})} G_a h(t - t'_{a,i}) \lambda_{a,i} + \tag{29}$$

$$\sum_{i=1}^{n_b} e^{F(t - t'_{b,i})} G_b h(t - t'_{b,i}) \lambda_{b,i} + \sum_{i=1}^{n_c} e^{F(t - t'_{c,i})} G_c h(t - t'_{c,i}) \lambda_{c,i},$$

where $G_a = G[100]^T$, $G_b = G[010]^T$, and $G_c = G[001]^T$.

The small-signal error can now be written in vector form as $$\tilde{x}(t,\Lambda) \approx e^{Ft}\tilde{x}_0 + \Gamma(t) + \Phi(t)\Lambda, \qquad (30)$$

where $\Phi(t) \in \mathbb{R}^{n_x \times n_{sw}}$ is the input matrix, $$\Phi(t) = \left[ e^{F(t-t'_{a,1})} G_a h(t - t'_{a,1}) \ldots e^{F(t-t'_{a,n_a})} \right. \qquad (31)$$
$$G_a h(t - t'_{a,n_a}) e^{F(t-t'_{b,1})} G_b h(t - t'_{b,1}) \ldots e^{F(t-t'_{b,n_b})} G_b$$
$$\left. h(t - t'_{b,n_b}) e^{F(t-t'_{c,1})} G_c h(t - t'_{c,1}) \ldots e^{F(t-t'_{c,n_c})} G_a h(t - t'_{c,n_c}) \right],$$

and $\Lambda \in \mathbb{R}^{n_{sw}}$ is introduced as the vector of impulse strengths, $$\Lambda = [\lambda_{a,1} \ldots \lambda_{a,n_a} \lambda_{b,1} \ldots \lambda_{b,n_b} \lambda_{c,1} \ldots \lambda_{c,n_c}]^T \qquad (32)$$

with the $n_{sw}$ impulse strengths over the horizon $T_p$. Note that $\Gamma(t)$ captures the behavior of the previous corrections. It will be shown below that it may be neglected at the expense of accuracy.

Control Method

In this section, the controller 18 and the control method performed by the controller is described in more detail. The controller 18 and the control method are based on the small-signal error expression (30).

Objective Function

The objective function $$J(\Lambda) = \int_0^{T_p} \|\tilde{x}(t)\|_Q^2 dt + \frac{1}{2}\|\Lambda\|_R^2 \qquad (33)$$

penalizes with the positive semidefinite penalty matrix $Q \in \mathbb{R}^{n_x \times n_x}$ the integral of the small-signal error over the prediction horizon of length $T_p$. Note that $\|\tilde{x}\|_Q^2 = \tilde{x}^T Q \tilde{x}$. The second term in (33) penalizes the strength of the voltage-time impulses in order to discourage unnecessarily large modifications to the incumbent pulse pattern. The corresponding penalty matrix $R \in \mathbb{R}^{n_{sw} \times n_{sw}}$, is required to be positive semidefinite.

First Term The first term can be expanded to $$J_1(\Lambda) = \int_0^{T_p} \left(e^{Ft}\tilde{x}_0 + \Gamma(t) + \Phi(t)\Lambda\right)^T Q\left(e^{Ft}\tilde{x}_0 + \Gamma(t) + \Phi(t)\Lambda\right) dt, \qquad (34)$$
$$= \int_0^{T_p} \left(\frac{1}{2}\Lambda^T Y(t)\Lambda + \Theta(t)^T \Lambda + \theta(t)\right) dt,$$
$$= \frac{1}{2}\Lambda^T \left(\int_0^{T_p} Y(t)dt\right)\Lambda + \left(\int_0^{T_p} \Theta(t)^T dt\right)\Lambda + \int_0^{T_p} \theta(t)dt,$$

where $$Y(t) = 2\Phi(t)^T(Q)\Phi(t), \qquad (35)$$

$$\Phi(t)^T = 2(e^{Ft}\tilde{x}_0 + \Gamma(t))^T Q\Phi(t) \qquad (36)$$

and $$\theta(t) = (e^{Ft}\tilde{x}_0 + \Gamma(t))^T Q(e^{Ft}\tilde{x}_0 + \Gamma(t)). \qquad (37)$$

Consider the (i',j')th entry of the $n_{sw} \times n_{sw}$ matrix $\Upsilon$ in (35). Assume that the i'th entry corresponds to phase $p_1 \in \{a, b, c\}$ and the ith switching transition in that phase. The quantities $p_2$ and j are defined accordingly for a given j'. The (i',j')th entry of $\Upsilon$ can then be written as $$\Upsilon_{(i'j')}(t) = 2(e^{F(t-t_{p1,i'})} G_{p1} h(t-t_{p1,i'}))^T Q e^{F(t-t_{p2,j'})} \qquad (38a)$$
$$G_{p2} h(t-t_{p2,j'}),$$

$$= 2G_{p1}^T (e^{F(t-t_{p1,i'})})^T Q e^{F(t-t_{p2,j'})} G_{p2} h(t-t_{ij'}), \qquad (38b)$$

where $t_{ij}' = \max\{t_{p1,i}', t_{p2,j}'\}$. The integral of (38b) results in $$V_{(i'j')} = 2\int_0^{T_p} G_{p1}^T \left(e^{F(t-t'_{p1,i})}\right)^T Q e^{F(t-t'_{p2,j})} G_{p2} h(t-t'_{ij}) dt. \qquad (39)$$

Calculating the integral of the product of two matrix exponentials, which do not commute, is not trivial. According to a theorem, the integral $$\Xi(t) = \int_0^t (e^{Fr})^T Q e^{Fr} dr \qquad (40)$$

can be calculated as $$\Xi(t) = M(t)^T N(t), \text{ where} \qquad (41)$$

$$e^{\begin{bmatrix} -F^T & Q \\ 0_{n_x \times n_x} & F \end{bmatrix} t} = \begin{bmatrix} (e^{Ft})^T & (e^{-Ft})^T \int_0^t (e^{Fr})^T Q e^{Fr} dr \\ 0_{n_x \times n_x} & e^{Ft} \end{bmatrix} = \begin{bmatrix} L(t) & N(t) \\ 0_{n_x \times n_x} & M(t) \end{bmatrix}. \qquad (42)$$

Next, the integral in (39) is rewritten in the form of (40) so that (41) and (42) can be used to solve it:

$$V_{(i'j')} = 2G_{p1}^T \left(e^{-Ft'_{p1,i}}\right)^T \int_0^{T_p} (e^{Ft})^T Q e^{Ft} h(t-t'_{ij}) dt e^{-Ft'_{p2,j}} G_{p2} \qquad (43)$$
$$= 2G_{p1}^T \left(e^{-Ft'_{p1,i}}\right)^T \int_{t'_{ij}}^{T_p} (e^{Ft})^T Q e^{Ft} dt e^{-Ft'_{p2,j}} G_{p2}$$

By time shifting the integrand forward by $t_{ij}'$, the integral becomes $$V_{(i'j')} = 2G_{p1}^T \left(e^{-Ft'_{p1,i}}\right)^T \int_0^{T_p-t'_{ij}} \left(e^{F(t+t'_{ij})}\right)^T Q e^{F(t+t'_{ij})} dt e^{-Ft'_{p2,j}} G_{p2} \qquad (44)$$
$$= 2G_{p1}^T \left(e^{F(t'_{ij}-t'_{p1,i})}\right)^T \int_0^{T_p-t'_{ij}} (e^{Ft})^T Q e^{Ft} dt e^{F(t'_{ij}-t'_{p2,j})} G_{p2}$$
$$= 2G_{p1}^T \left(e^{F(t'_{ij}-t'_{p1,i})}\right)^T \Xi(T_p - t'_{ij}) e^{F(t'_{ij}-t'_{p2,j})} G_{p2}.$$

The $n_{sw}$-dimensional column vector $\Theta(t)$ in (36) is split it up into two terms $$\Theta(t)^T = \Theta_0(t)^T + \Theta_\Gamma(t)^T \qquad (45)$$

where $$\Theta_0(t)^T = 2(e^{Ft}\tilde{x}_0)^T Q\Phi(t) \qquad (46)$$

$$\Theta_\Gamma(t)^T = 2(\Gamma(t))^T Q\Phi(t). \qquad (47)$$

Consider the i'th entry of $\Theta_0(t)^T$, and assume that it corresponds to phase p and the ith switching transition in that phase. With (31), $$\Theta_{0,i'}(t)^T = 2\tilde{x}_0^T (e^{Ft})^T Q e^{F(t-t_{p,i}')} G_p h(t-t_{p,i}'). \quad (48)$$

Its integral $$c_{0,i'}^T = 2\tilde{x}_0^T \int_{t_{p,i}'}^{T_p} (e^{Ft})^T Q e^{F(t-t_{p,i}')} dt G_p, \quad (49)$$

can also be written in the form of (40), so that (41) and (42) can be used to solve it. Following a time shift forward by $t_{p,i}'$, the integral becomes $$c_{0,i'}^T = 2\tilde{x}_0^T \left(e^{Ft_{p,i}'}\right)^T \int_0^{T_p - t_{p,i}'} (e^{Ft})^T Q e^{Ft} dt G_p, \quad (50)$$

$$= 2\tilde{x}_0^T \left(e^{Ft_{p,i}'}\right)^T \Xi(T_p - t_{p,i}') G_P.$$

The calculation involving the second term in (45), $$c_{\Gamma,i'}^T = \int_0^{T_p} 2(\Gamma(t))^T Q \Phi(t) dt, \quad (51)$$

are moved to Appendix B.
The i'th entry of the vector c is then given by $$c_i = c_{0,i'} + c_{\Gamma,i'}. \quad (52)$$

Note that $\theta(t)$ in (34) is not a function of the vector of impulse strengths $\Lambda$. Therefore, it is merely a constant in the cost function, which has no influence on the solution of the to-be-derived optimization problem. This fact allows us to omit $\theta(t)$ hereafter.

The first term of the objective function, $J_1$, which minimizes the small-signal error, can now be written as $$J_1(\Lambda) = \tfrac{1}{2}\Lambda^T V \Lambda + c^T \Lambda. \quad (53)$$

Second term The second term of the objective function, which penalizes the entries of the vector of impulse strengths $\Lambda$, is $$J_2(\Lambda) = \tfrac{1}{2}\Lambda^T R \Lambda. \quad (54)$$

Vector Form The objective function is the quadratic function $$J(\Lambda) = J_1(\Lambda) + J_2(\Lambda) = \tfrac{1}{2}\Lambda^T (V+R)\Lambda + c^T \Lambda$$

$$= \tfrac{1}{2}\Lambda^T H \Lambda + c^T \Lambda, \quad (55)$$

where $H = V + R$ is known as the Hessian and contains the second-order partial derivatives of $J(\Lambda)$, and c is a vector with linear coefficients.

In the above, the matrix V is also called the model matrix, while the vector c is called the model vector. The matrix R is called the penalty matrix.

Constraints

To enforce an ascending order on the modified switching instants in each phase, the set of constraints $$0 \leq t_{p,1} \leq t_{p,2} \leq \ldots \leq t_{p,n_p} \leq T_p \quad (56)$$

must be imposed for each phase p. Switching instants cannot be shifted into the past and not beyond the prediction horizon $T_p$. Alternatively, the $n_p$th switching transition in a phase can be upper bounded by the next incumbent switching transition beyond the horizon, $t_{p,n_p+1}'$.

With the help of (16) and (18), the set of constraints (56) can be recast in terms of the impulse strengths $\lambda_{p,i}$:

$$0 \leq t_{p,1}' - \frac{\lambda_{p,1}}{\Delta u_{p,1}} \leq t_{p,2}' - \frac{\lambda_{p,2}}{\Delta u_{p,2}} \leq \ldots \leq t_{p,n_p}' - \frac{\lambda_{p,n_p}}{\Delta u_{p,n_p}} \leq T_p. \quad (57)$$

Applying (57) to the phases a, b, and c, the constraint $$A\Lambda \leq B \quad (58)$$

in matrix form arises, with respect to $$A = \begin{bmatrix} A_a & & \\ & A_b & \\ & & A_c \end{bmatrix}, \text{ with} \quad (59)$$

$$A_p = \begin{bmatrix} \frac{1}{\Delta u_{p,1}} & 0 & 0 & \cdots & 0 & 0 \\ -\frac{1}{\Delta u_{p,1}} & \frac{1}{\Delta u_{p,2}} & 0 & \cdots & 0 & 0 \\ & -\frac{1}{\Delta u_{p,2}} & \frac{1}{\Delta u_{p,3}} & & 0 & 0 \\ \vdots & & & \ddots & \vdots & \vdots \\ 0 & 0 & 0 & \cdots & -\frac{1}{\Delta u_{p,n_p-1}} & \frac{1}{\Delta u_{p,n_p}} \\ 0 & 0 & 0 & \cdots & 0 & \frac{1}{\Delta u_{p,n_p}} \end{bmatrix} \text{ and}$$

$$B = [B_a^T \ B_b^T \ B_c^T]^T, \text{ with} \quad (60)$$

$$B_p = [t_{p,1}' \ t_{p,2}' - t_{p,1}' \ \cdots \ T_p - t_{p,n_p}']^T.$$

Additional constraints may be added to the controller formulation. For example, state constraints in the form of $\tilde{x}(t) \in X$, with the time $t \in [0, T_p]$, could be added to (61b), see below. Provided that the constraint set X is a polyhedron, the optimization problem (61) below remains a convex QP.

Quadratic Program

Minimizing the objective function (55) while respecting the constraint (58) leads to the quadratic program (QP)

$$\Lambda_{opt} = \operatorname*{argmin}_{\Lambda} \tfrac{1}{2}\Lambda^T H \Lambda + c^T \Lambda \quad (61a)$$

subject to $A\Lambda \leq B$. \quad (61b)

The vector of impulse strengths $\Lambda$ is the decision (or optimization) variable, and $\Lambda_{opt}$ is the optimal solution to the QP. The latter cannot be solved algebraically; instead, numerical optimization techniques must be employed, such as gradient methods or interior point methods.

Note that the problem (61) is convex, since the constraints are linear and the objective function is quadratic in the decision variable with a positive semidefinite Hessian H. One can show that this follows from the fact that the penalty matrices Q and R are positive semidefinite. If R is positive definite, then the Hessian H is also positive definite.

Optimal Switching Instants

Having solved the QP (61), the vector of optimal pulse strengths $\Lambda_{opt}$ is translated with (18) into the optimal switching instant advancements or delays $$\Delta t_{opt,p,i} = -\frac{\lambda_{opt,p,i}}{\Delta u_{p,i}}. \tag{62}$$

By adding these modifications to the incumbent switching instants of the pulse pattern, the optimal switching instants are obtained $$t_{opt,p,i} = t'_{p,i} - \frac{\lambda_{opt,p,i}}{\Delta u_{p,i}}, \tag{63}$$

where (16) was used.

Standard Controller

The computational burden of the control algorithm can be reduced if the switching instant updating step is neglected (i.e. the linearization is always done around the nominal switching instants). This implies that the incumbent pulse pattern $u_{abc}(t)$ is replaced by the nominal pulse pattern $u_{abc}*(t)$. Because the incumbent pulse pattern and the nominal pulse pattern are then equal, the small-signal error in (30) reduces to $$\tilde{x}(t,\Lambda) \approx e^{Ft}\tilde{x}_0 + \Phi(t)\Lambda. \tag{64}$$

The i'th entry of the linear term in the cost function, see (52), then reduces to $c_i' = c_{0,1}'$.

The accuracy of the small-signal error prediction may be reduced. Recall that the voltage-time areas in FIG. 3A where approximated by the voltage-time strengths of their corresponding impulses. Small modifications, and thus small voltage-time areas with small impulse strengths are accurately represented, but a certain error may arise for larger modifications. These errors may manifest themselves in inaccurate predictions. Nevertheless, thanks to the receding horizon policy, these inaccuracies may be compensated by the controller.

APPENDIX A

The expression $\Gamma(t)$ defined in (28), which appears in (30), can be re-arranged as $$\Gamma(t) = \sum_{i=1}^{n_a}\left(e^{F(t-t'_{a,i})} - I\right)F^{-1}G_a\Delta u_{a,i}h(t-t'_{a,i}) + \tag{65}$$

$$\sum_{i=1}^{n_b}\left(e^{F(t-t'_{b,i})} - I\right)F^{-1}G_b\Delta u_{b,i}h(t-t'_{b,i}) +$$

$$\sum_{i=1}^{n_c}\left(e^{F(t-t'_{c,i})} - I\right)F^{-1}G_c\Delta u_{c,i}h(t-t'_{c,i}) -$$

$$\sum_{i=1}^{n_a^*}\left(e^{F(t-t^*_{a,i})} - I\right)F^{-1}G_a\Delta u^*_{a,i}h(t-t^*_{a,i}) -$$

$$\sum_{i=1}^{n_b^*}\left(e^{F(t-t^*_{b,i})} - I\right)F^{-1}G_b\Delta u^*_{b,i}h(t-t^*_{b,i}) -$$

$$\sum_{i=1}^{n_c^*}\left(e^{F(t-t^*_{c,i})} - I\right)F^{-1}G_c\Delta u^*_{c,i}h(t-t^*_{c,i}) + \left(e^{Ft} - I\right)F^{-1}G\Delta u_{abc,0}$$

where it has been used that an integral involving the step function is $$\int_0^t e^{F(t-r)}G_p\Delta u_{p,i}h(r-t'_{p,i})dr = \left(e^{F(t-t'_{p,i})} - I\right)F^{-1}G_p\Delta u_{p,i}h(t-t'_{p,i}).$$

Here, $\Delta u_{abc,0}{}^T = [u_{a,0}u_{b,0}u_{c,0}]^T - [u_{a,0}*u_{b,0}*u_{c,0}*]^T$ has been introduced.

(65) is decomposed into three terms $$\Gamma(t) = \Gamma'(t) - \Gamma^*(t) + \Gamma_0(t), \tag{66}$$

$$\Gamma'(t) = \sum_{i=1}^{n_a}\left(e^{F(t-t'_{a,i})} - I\right)F^{-1}G_a\Delta u_{a,i}h(t-t'_{a,i}) +$$

$$\sum_{i=1}^{n_b}\left(e^{F(t-t'_{b,i})} - I\right)F^{-1}G_b\Delta u_{b,i}h(t-t'_{b,i}) +$$

$$\sum_{i=1}^{n_c}\left(e^{F(t-t'_{c,i})} - I\right)F^{-1}G_c\Delta u_{c,i}h(t-t'_{c,i}), \tag{68}$$

$$\Gamma^*(t) = \sum_{i=1}^{n_a^*}\left(e^{F(t-t^*_{a,i})} - I\right)F^{-1}G_a\Delta u^*_{a,i}h(t-t^*_{a,i}) +$$

$$\sum_{i=1}^{n_b^*}\left(e^{F(t-t^*_{b,i})} - I\right)F^{-1}G_b\Delta u^*_{b,i}h(t-t^*_{b,i}) +$$

$$\sum_{i=1}^{n_c^*}\left(e^{F(t-t^*_{c,i})} - I\right)F^{-1}G_c\Delta u^*_{c,i}h(t-t^*_{c,i}),$$

$$\Gamma_0(t) = \left(e^{Ft} - I\right)F^{-1}G\Delta u_{abc,0}. \tag{69}$$

APPENDIX B

The equations involving the integral of (66) are evaluated. The integrals of the terms in (48) will be considered separately, $$c^T_{\Gamma,i} = \int_0^{T_p}\Theta_{\Gamma',i'}(t)^T dt + \int_0^{T_p}\Theta_{\Gamma^*,i'}(t)^T dt + \int_0^{T_p}\Theta_{\Gamma_0,i'}(t)^T dt = \tag{70}$$

$$c^T_{\Gamma',i'} + c^T_{\Gamma^*,i'} + c^T_{\Gamma_0,i'}, \text{where}$$

$$\Theta_{\Gamma',i'}(t)^T = 2\Gamma'(t)^T Q e^{F(t-t'_{p,i})}G_p h(t-t'_{p,i}) \tag{71}$$

$$\Theta_{\Gamma^*,i'}(t)^T = 2\Gamma^*(t)^T Q e^{F(t-t'_{p,i})}G_p h(t-t'_{p,i}) \tag{72}$$

$$\Theta_{\Gamma_0,i'}(t)^T = 2\Gamma_0(t)^T Q e^{F(t-t'_{p,i})}G_p h(t-t'_{p,i}) \tag{73}$$

First, (71) is further decomposed into each phase separately $$\Theta_{\Gamma',p2,i'}(t)^T = 2\sum_{j=1}^{n_{p2}}\Delta u_{p2,j}G^T_{p,2}(F^{-1})^T\left(e^{F(t-t'_{p2,j})} - I\right)^T \tag{74}$$

$$h(t-t'_{p2,j})Qe^{F(t-t'_{p,i})}G_p h(t-t'_{p,i})$$

$$= 2G^T_{p2}(F^{-1})^T \sum_{j=1}^{n_{p2}}$$

$$\left(\Delta u_{p2,j}\left(e^{F(t-t'_{p2,j})} - I\right)^T Qe^{F(t-t'_{p,i})}h(t-t'_{p,i})\right)G_p,$$

where $p_2$ is a particular phase of (67) and $t_{ij}' = \max\{t_{p,i}', t_{p2,j}'\}$. Note that $\Theta_{\Gamma,i}(t) = \Theta_{\Gamma,a,i}(t) + \Theta_{\Gamma,b,i}(t) + \Theta_{\Gamma c,i}(t)$. Its integral is split into two parts $$c_{\Gamma',p2,t'}^T = 2G_{p2}^T(F^{-1})^T \sum_{j=1}^{n_{p2}} \quad (75)$$

$$\left( \Delta u_{p2,j} \int_0^{T_p} \left( e^{F(t-t'_{p2,j})} - I \right)^T Q e^{F(t-t'_{p,i})} h(t - t'_{ij}) dt \right) G_p$$

$$= 2G_{p2}^T(F^{-1})^T \sum_{j=1}^{n_{p2}}$$

$$\left( \Delta u_{p2,j} \left( \int_{t'_{ij}}^{T_p} \left( e^{F(t-t'_{p2,j})} \right)^T Q e^{F(t-t'_{p,i})} dt - \int_{t'_{ij}}^{T_p} Q e^{F(t-t'_{p,i})} dt \right) \right) G_p$$

and following a time shift forward with $t_{ij}'$, and using algebraic manipulations similar to the derivation of (44), becomes $$c_{\Gamma',p2,t'}^T = 2G_{p2}^T(F^{-1})^T \quad (76)$$

$$\sum_{j=1}^{n_{p2}} \left( \Delta u_{p2,j} \left( \left( e^{F(t'_{ij}-t'_{p2,j})} \right)^T \Xi(T_p - t'_{ij}) - \int_0^{T_p-t'_{ij}} Q e^{Ft} dt \right) e^{F(t'_{ij}-t'_{p,i})} \right) G_p,$$

where $\Xi(t)$ is defined in (40). The second integral can be calculated using $$W(t) = \int_0^t Q e^{Ft} dt \text{ where} \quad (77)$$

$$e^{\begin{bmatrix} 0_{n_x \times n_x} & Q \\ 0_{n_x \times n_x} & F \end{bmatrix} t} = \begin{bmatrix} I_{n_x} & \int_0^t Q e^{Fr} dr \\ 0_{n_x \times n_x} & e^{Ft} \end{bmatrix} = \begin{bmatrix} I_{n_x} & W(t) \\ 0_{n_x \times n_x} & M(t) \end{bmatrix}. \quad (78)$$

Using (77), (76) becomes $$c_{\Gamma',p2,t'}^T = 2G_{p2}^T(F^{-1})^T \quad (79)$$

$$\sum_{j=1}^{n_{p2}} \left( \Delta u_{p2,j} \left( \left( e^{F(t'_{ij}-t'_{p2,j})} \right) \Xi(T_p - t'_{ij}) - W(T_p - t'_{ij}) \right) e^{F(t'_{ij}-t'_{p,i})} \right) G_p.$$

Next consider (72), which has the same structure as (71), and after following the same derivations used in the calculation of the latter, can be stated as $$c_{\Gamma^*,p2,t'}^T = 2G_{p2}^T(F^{-1})^T \quad (80)$$

$$\sum_{j=1}^{n_{p2}^*} \left( \Delta u_{p2,j}^* \left( \left( e^{F(t_{ij}^{'*}-t_{p2,j}^{'*})} \right) \Xi(T_p - t'_{ij}) - W(T_p - t'_{ij}) \right) e^{F(t_{ij}^{'*}-t'_{p,i})} \right) G_p.$$

where $t_{ij}'^* = \max\{t'_{p,i}, t_{p2,j}'^*\}$.

Lastly, consider (73), which can be re-written as $$\Theta_{\Gamma_0,i}(t)^T = 2\Delta u_{abc,0}^T G^T (F^{-1})^T (e^{Ft} - I)^T Q e^{F(t-t_{p,i}')} G_p h(t-t_{p,i}'). \quad (81)$$

Its integral is also split into two parts $$c_{\Gamma_0,i}^T = 2\Delta u_{abc,0}^T G^T (F^{-1})^T \left( \int_{t'_{p,i}}^{T_p} (e^{Ft})^T Q e^{F(t-t'_{p,i})} dt - \int_{t'_{p,i}}^{T_p} Q e^{F(t-t'_{p,i})} dt \right) G_p \quad (82)$$

and following a time shift forward by $t_{p,i}$ becomes $$c_{\Gamma_0,t'}^T = \quad (83)$$

$$2\Delta u_{abc,0}^T G^T (F^{-1})^T \left( \left( e^{Ft'_{p,i}} \right)^T \int_0^{T_p-t'_{p,i}} (e^{Ft})^T Q e^{Ft} dt - \int_0^{T_p-t'_{p,i}} Q e^{Ft} dt \right) G_p.$$

Using (41) and (77), (83) becomes $$c_{\Gamma_0,t'}^T = 2\Delta u_{abc,0}^T G^T (F^{-1})^T ((e^{Ft'_{p,i}})^T \Xi(T_p - t'_{p,i}) - W(T_p - t'_{p,i})) G_p. \quad (84)$$

Symbols t Time, $t \in \mathbb{R}^+$
k Discrete time step, $k \in \mathbb{N}$
d Pulse number, $d \in \mathbb{N}$
m Modulation index, $m \in [0, 4/\pi]$
p A particular phase, $p \in \{a, b, c\}$
$u_{p,i}$ ith single-phase switch position of phase p, $u_{p,i} \in \{-1, 0, 1\}$
$\Delta u_{p,i}$ ith switching transition in phase p, $\Delta u_{p,i} \in \{-1, 1\}$
$\lambda_{p,i}$ ith impulse strength (also known as the voltage-time value) in phase p, $\lambda_{p,i} \in \mathbb{R}$
$\Lambda$ Vector of impulse strengths (also known as the vector of voltage-time values) over the horizon, $\Lambda \in \mathbb{R}^{n_{sw}}$
$t_{p,i}^*$ ith nominal switching instant of phase p
$t_{p,i}'$ ith incumbent switching instant of phase p
$t_{p,i}$ ith modified switching instant of phase p
$\Delta t_{p,i}$ ith switching instant modification of phase p, $\Delta t_{p,i} = t_{p,i} - t_{p,i}'$
$u_{abc}^*(t)$ Three-phase nominal pulse pattern
$u_{abc}(t)$ Three-phase incumbent pulse pattern
$u_{mod,abc}(t)$ Three-phase modified pulse pattern
$\tilde{u}(t)$ Three-phase small-signal pulse pattern, defined as $\tilde{u}(t) = u_{mod,abc}(t) - u_{abc}(t)$
$\bar{u}(t)$ Three-phase difference pulse pattern, defined as $\bar{u}(t) = -u_{abc}(t) - u^*_{abc}(t)$
X(t) State vector
x*(t) Optimal (reference) trajectory of the state vector
$\tilde{x}(t)$ Small-signal error, defined as: $\tilde{x}(t) = x(t) - x^*(t)$
$T_p$ Prediction horizon in time, $T_p \in \mathbb{R}^+$
$T_s$ Sampling interval of the controller, $T_s \in \mathbb{R}^+$
$n_p$ Number of switching transitions in phase p occurring within the horizon
$n_{sw}$ Total number of switching transitions within horizon, $n_{sw} = n_a + n_b + n_c$
F System matrix in the continuous-time domain
G Input matrix in the continuous-time domain
P Parameter matrix in the continuous-time domain
H Hessian matrix in the QP
c Column vector in the QP Variables z(t) Scalar quantity in the continuous-time domain
z Column vector referring to, e.g., a three-phase quantity

Abbreviations ac Alternating current
dc Direct current
MPC Model predictive control
MP³C Model predictive pulse pattern control
NPC Neutral-point-clamped
OPP Optimized pulse pattern
PWM Pulse width modulation
QP Quadratic program
rms Root-mean-square While embodiments of the present disclosure have been illustrated and described in detail in the drawings and foregoing description, such illustration and description are to be considered illustrative or exemplary and not restrictive; the present disclosure is not limited to the disclosed embodiments. Other variations to the disclosed embodiments can be understood and effected by those skilled in the art from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for controlling an electrical converter system, the method comprising:
   determining a nominal pulse pattern ($t_{p,i}^*$, $\Delta u_{p,i}$) and a reference trajectory ($x^*$) of at least one electrical quantity of the electrical converter system over a horizon of future sampling instants, wherein the nominal pulse pattern ($t_{p,i}^*$, $\Delta u_{p,i}^*$) and the reference trajectory ($x^*$) are determined from a table of optimized pulse patterns, the nominal pulse pattern ($t_{p,i}^*$, $\Delta u_{p,i}^*$) comprises switching transitions ($\Delta u_{p,i}^*$) between output voltages of an electrical converter of the electrical converter system, and the reference trajectory ($x^*$) indicates a desired future development of an electrical quantity of the converter system;
   determining a small-signal pulse pattern ($\tilde{u}_{abc}(t, \lambda_{p,i})$) by minimizing a cost function, wherein the cost function includes a small-signal error, wherein the small-signal error is based on a difference of the reference trajectory ($x^*$) and a predicted trajectory ($x$), wherein impulse strengths ($\lambda_{p,i}$) of the small-signal pulse pattern ($\tilde{u}_{abc}(t,\lambda p,i)$) encode a voltage-time value at each switching transition of the nominal pulse pattern ($t_{p,i}^*$, $\Delta u_{p,i}^*$), and wherein the predicted trajectory ($x$) is determined over the horizon from measurements (i, $v_c$, $i_g$) in the converter system and from a model of the converter system, into which a sum of the nominal pulse pattern ($t_{p,i}^*$, $\Delta u_{p,i}^*$) and small-signal pulse pattern ($\tilde{u}_{abc}(t,\lambda_{p,i})$) are input;
   determining a modified pulse pattern ($t_{opt,p,i}$, $\Delta u_{p,i}$) by moving the switching transitions of the nominal pulse pattern ($t_{p,i}^*$, $\Delta u_{p,i}^*$) to generate modified switching transitions, wherein a switching transition is moved by a time interval, such that the time interval times a direction of the switching transition equals the voltage-time value that the impulse strength ($\lambda_{p,i}$) encodes at a nominal switching transition of the nominal pulse pattern ($t_{p,i}^*$, $\Delta u_{p,i}^*$); and
   applying at least a next switching transition of the modified pulse pattern ($t_{opt,p,i}$, $\Delta u_{p,i}$) to the electrical converter system.

2. The method of claim 1,
   wherein switching transitions of the modified pulse pattern ($t_{opt,p,i}$, $\Delta u_{p,i}$) during a current sampling interval are applied to the electrical converter system, and
   wherein, during the current sampling interval, the small-signal pulse pattern ($\tilde{u}_{abc}(t, \lambda_{p,i})$) and the modified pulse pattern ($t_{opt,p,i}$, $\Delta u_{p,i}$) are determined again for a horizon starting at a next sampling interval.

3. The method of claim 1,
   wherein the cost function is a quadratic function in the impulse strengths ($\lambda_{p,i}$), which are arranged into a vector of impulse strengths ($\Lambda$),
   wherein the cost function comprises a quadratic term with a model matrix (V), which is multiplied at both sides by the vector of impulse strengths ($\Lambda$) and a linear term with a model vector (c) multiplied by the vector of impulse strengths ($\Lambda$), and
   wherein the model matrix (V) and the model vector (c) are determined from measurements (i, $v_c$, $i_g$) in the converter system, the reference trajectory ($x^*$), and the small-signal pulse pattern ($\tilde{u}_{abc}(t,\lambda_{p,i})$) such that the cost function encodes the small-signal error.

4. The method of claim 1,
   wherein the cost function additionally minimizes a magnitude of the impulse strengths ($\lambda_{p,i}$).

5. The method of claim 1,
   wherein the cost function comprises a quadratic term with a penalty matrix (R), which is multiplied at both sides by a vector of impulse strengths ($\Lambda$).

6. The method of claim 1,
   wherein the small-signal pulse pattern ($\tilde{u}_{abc}(t,\lambda_{p,i})$) is determined by minimizing the cost function subject to constraints, and
   wherein the impulse strengths ($\lambda_{p,i}$) of the small-signal pulse pattern ($\tilde{u}_{abc}(t,\lambda_{p,i})$) are constrained, such that the modified switching transitions in the same phase stay in an original order.

7. The method of claim 1,
   wherein the small-signal pulse pattern ($\tilde{u}_{abc}(t,\lambda_{p,i})$) is determined by solving a quadratic program into which the reference trajectory ($x^*$), the measurements (i, $v_c$, $i_g$), and the small-signal pulse pattern ($\tilde{u}_{abc}(t,\lambda_{p,i})$) are input.

8. The method of claim 1, further comprising:
   determining an incumbent pulse pattern ($t_{p,i}'$, $\Delta u_{p,i}$) over the horizon, wherein the incumbent pulse pattern ($t_{p,i}'$, $\Delta u_{p,i}$) comprises the modified switching transitions ($t_{opt,p,i}$) determined at a previous sampling instant and remaining switching transitions of the nominal pulse pattern ($t_{p,i}^*$, $\Delta u_{p,i}^*$) up to the horizon,
   wherein the predicted trajectory (x) is determined from the model of the converter system, into which a sum of the incumbent pulse pattern ($t_{p,i}'$, $\Delta u_{p,i}$) and small-signal pulse pattern ($\tilde{u}_{abc}(t, \lambda_{p,i})$) are input.

9. The method of claim 8,
   wherein the impulse strengths ($\lambda_{p,i}$) of the small-signal pulse pattern ($\tilde{u}_{abc}(t, \lambda_{p,i})$) are positioned at each switching transition of the incumbent pulse pattern ($t_{p,i}'$, $\Delta u_{p,i}$), and
   wherein a difference pulse pattern ($\bar{u}_{abc}(t)$) is determined, which encodes at least one rectangular voltage-time area compensating a difference between the nominal pulse pattern ($t_{p,i}^*$, $\Delta u_{p,i}^*$) and the incumbent pulse pattern ($t_{p,i}'$, $\Delta u_{p,i}$).

10. The method of claim 1,
wherein the optimized pulse patterns and/or the at least one reference trajectory ($x^*$) are determined offline and stored in a lookup table.

11. A computer program, which when executed by a processor is adapted for performing the method of claim 1.

12. A non-transitory computer-readable medium, in which a computer program according to claim 11 is stored.

13. A controller for an electrical converter adapted for performing the method of claim 1.

14. A converter system, comprising:
an electrical converter interconnected with an electrical grid; and
a controller according to claim 13 for controlling the electrical converter.

15. The converter system of claim 14, further comprising:
a resonant subsystem comprising at least one of inductors and a filter,
wherein the model of the converter system used during optimizing the cost function includes a model of the electrical converter and the resonant subsystem.

\* \* \* \* \*